United States Patent
Neale et al.

(10) Patent No.: US 7,552,395 B2
(45) Date of Patent: Jun. 23, 2009

(54) GRAPHICAL USER INTERFACE FOR BUILDING BOOLEAN QUERIES AND VIEWING SEARCH RESULTS

(76) Inventors: Richard S. Neale, 1260 Albion La., Sunnyvale, CA (US) 94087; Loren L. Hart, 4254 Indio Dr., San Jose, CA (US) 95136; Charlton D. Rose, 13263 Mount Logan St., Reno, NV (US) 89506

( * ) Notice: Subject to any disclaimer, the term of this patent is extended or adjusted under 35 U.S.C. 154(b) by 912 days.

(21) Appl. No.: 11/113,654

(22) Filed: Apr. 25, 2005

(65) Prior Publication Data
US 2005/0192953 A1 Sep. 1, 2005

Related U.S. Application Data

(62) Division of application No. 09/610,632, filed on Jul. 5, 2000, now Pat. No. 6,925,608.

(51) Int. Cl.
G06F 3/048 (2006.01)
G06F 15/177 (2006.01)
G06F 3/00 (2006.01)
G06F 17/00 (2006.01)

(52) U.S. Cl. .................. 715/763; 715/735; 715/716; 715/721; 715/762; 715/853; 715/734; 715/780; 715/781; 715/810; 715/967; 707/3; 707/4; 707/5

(58) Field of Classification Search .......... 715/780, 715/781, 810, 967, 763, 735, 716, 721, 762; 707/44, 104, 100, 103, 10, 3, 4, 5
See application file for complete search history.

(56) References Cited

U.S. PATENT DOCUMENTS

| | | | | |
|---|---|---|---|---|
| 5,832,470 A | * | 11/1998 | Morita et al. | 707/1 |
| 5,966,126 A | * | 10/1999 | Szabo | 715/762 |
| 6,009,442 A | * | 12/1999 | Chen et al. | 715/205 |
| 6,009,459 A | * | 12/1999 | Belfiore et al. | 709/203 |
| 6,169,992 B1 | * | 1/2001 | Beall et al. | 707/103 R |
| 6,208,985 B1 | * | 3/2001 | Krehel | 707/3 |
| 6,216,122 B1 | * | 4/2001 | Elson | 707/3 |
| 6,226,630 B1 | * | 5/2001 | Billmers | 707/3 |
| 6,321,228 B1 | * | 11/2001 | Crandall et al. | 707/10 |
| 6,338,059 B1 | * | 1/2002 | Fields et al. | 707/4 |
| 6,363,377 B1 | * | 3/2002 | Kravets et al. | 707/4 |
| 6,418,429 B1 | * | 7/2002 | Borovoy et al. | 707/3 |
| 6,467,052 B1 | * | 10/2002 | Kaler et al. | 714/39 |
| 6,725,227 B1 | * | 4/2004 | Li | 707/102 |
| 6,785,668 B1 | * | 8/2004 | Polo et al. | 707/2 |
| 6,834,276 B1 | * | 12/2004 | Jensen et al. | 707/2 |
| 7,024,405 B2 | * | 4/2006 | Salerno et al. | 707/3 |

* cited by examiner

*Primary Examiner*—Sy D Luu
*Assistant Examiner*—Linh K Pham

(57) ABSTRACT

Graphical user interfaces and method for building Boolean queries and viewing search results using search cells, combination cells, toolbar, and menu bar. Search cells are movable within a workspace and contain a text field, facet type designation, advanced button, and hit count. Categories are chosen using a category walker. Combination cells, a Boolean combination of two or more selected search cells, are also movable and contain a combine icon, hit count, and an expression field. The Boolean query is depicted in a folder tree hierarchy, where search folders are shown within combination folders, which are represented as logical AND, OR, or MINUS folder icons. An applet in a browser accesses a server through the Internet.

7 Claims, 10 Drawing Sheets

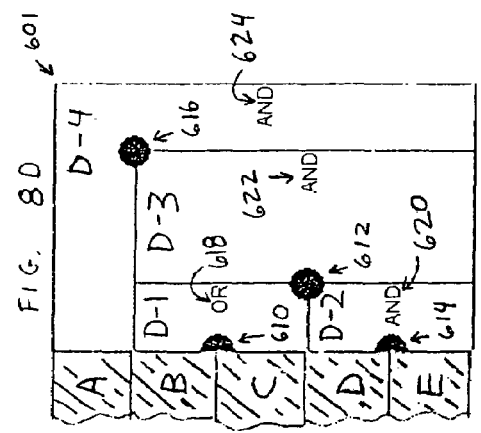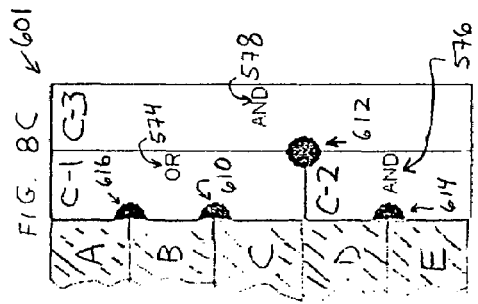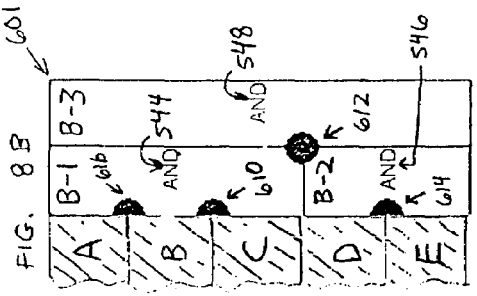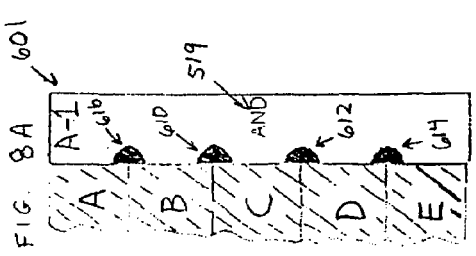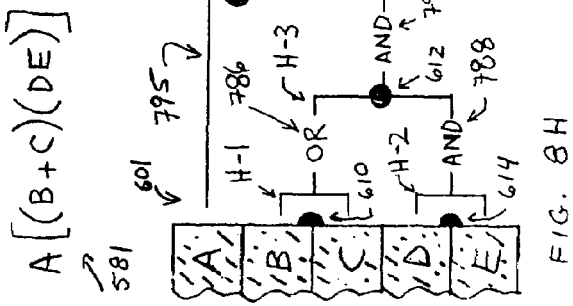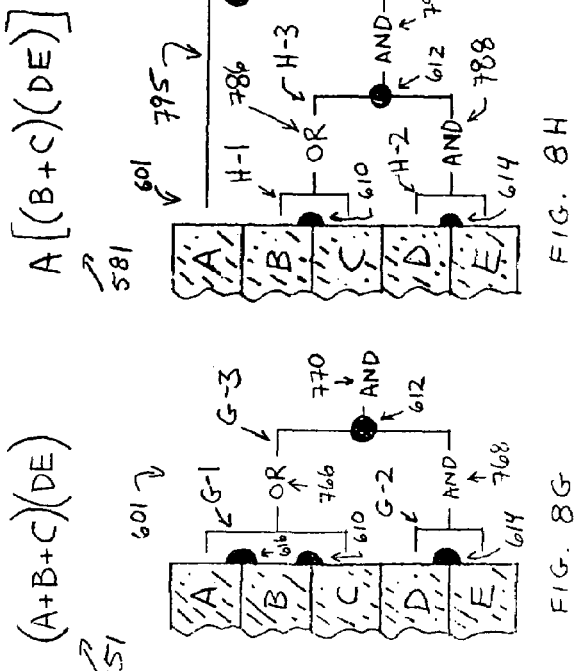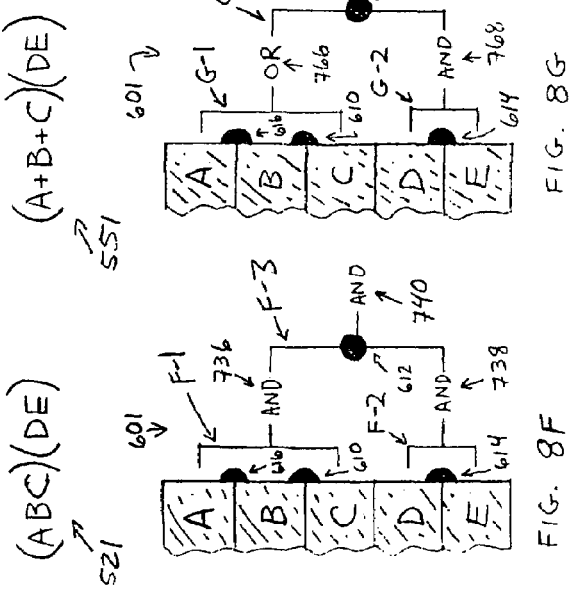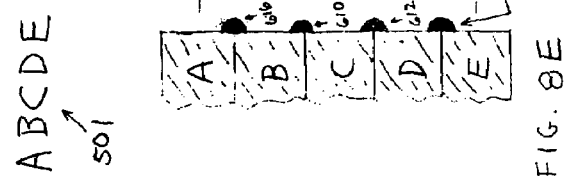

GRAPHICAL USER INTERFACE FOR BUILDING BOOLEAN QUERIES AND VIEWING SEARCH RESULTS

RELATED APPLICATION

This application is a divisional application based on prior application Ser. No. 09/610,632, filed on Jul. 5, 2000, now U.S. Pat. No. 6,925,608.

FIELD OF THE INVENTION

The present invention relates to the field of computers having graphically-oriented user interfaces. More particularly, the present invention relates to the field of constructing Boolean queries and viewing search results through a graphical user interface displayed on a computer.

BACKGROUND OF THE INVENTION

Increased memory and remote electronic data storage capacity offers access to large amounts of data in a very convenient form and physical size. Data may be available on diskette, CD-ROM, magnetic tape, and on line to a centrally located computer and memory storage medium. The challenge remains to extract information from the data simply and efficiently and to have confidence in the result that all relevant items have been uncovered. To focus in on relevant database records, search engines generally use keywords, categorization, segment limitations, Boolean logic, and hit counts. More complex search engines can also employ hierarchical categorization and multifaceted searching.

Keywords are the basis of most searches. A simple keyword search, such as that found in most word processors under the "Find" command, will locate the occurrence of a text string within a document or a record. Misspellings, synonyms, or different tenses of a given text string will not be located. The searcher must be cautious to truncate the text string to a word's root. A search for the text string "graphical", for instance, will not locate instances of the text string "graphics." The searcher must also not choose commonly occurring words, as such a search would result in a high number of search results. Keywords are commonly combined with categorization, segment limitations, Boolean logic operators, advanced keywording, date operators and numeric operators to create a more effective search.

Categorization is a technique used to focus the scope of a search. A category is a subset of records. By conducting a search only within this subset of records, fewer irrelevant hits result. Lexis-Nexis™ and Dialog™, two online searchable databases with proprietary search engines, are examples of categorized databases. Prior to conducting a keyword search within the Lexis-Nexis™ or Dialog™ database, the searcher must select from an extensive list of categories. Some categories are broader than others. If the searcher selects an overly broad category, his or her search will result in too many irrelevant hits and the searcher will waste time sorting through the undesired search result records looking for relevant hits. If the searcher selects an overly narrow category, his or her search results will not include some of the desired records. Selection of an appropriate category, therefore, is of vital importance.

Searches can be further focused with the use of segment limitations. "Segments" are similar to categories in that they are domain specific. Category classifications are used to divide multiple records into subsets, or "fields". Segment classifications are used to divide individual records into specific groupings of information. Using segments, keyword searches can be targeted at certain fields of a record, such as a record's title or author. Search engines distributed by Lexis-Nexis™ and Dialog™, two online searchable database providers, are well-adapted to such targeted searches, often using dozens of segments for each category of records. A news article record, for instance, is typically broken down into separate fields for byline, date, publisher, abstract, and body. To find a news article with the word "elephant" in the title (or headline) using the classical interface of the Lexis-Nexis™ search engine, the following syntax would be needed: "HEADLINE(elephant)".

Using keyword searching may not be very helpful if the user is not familiar with the appropriate standard terminology related to the information they are looking for. Further, there may be many appropriate ways to describe the information sought by the user. A concept expressed by a standard industry term in one industry may be different from a standard industry term in a different industry. A keyword search would require searching all synonyms used in order to ensure a complete and accurate result.

When a user of a searching/retrieval system enters a keyword search query into a system, the query is parsed. Based on the parsed query, a listing of documents relevant to the query is provided to the user. In the prior art, it is also known to use semantic networks when parsing a query. The number of words used to search the database is then expanded by including the corresponding words or associated words identified by the semantic network in the search instructions. This expansion can be based on any one or a combination of using stems or roots of terms, using sound-a-like words, using wildcard words or any other appropriate semantic technique.

Boolean operators, such as "AND", "OR" and "MINUS", are used to enhance the capabilities of a search engine. The basic format of Boolean queries is well known in the art and generally takes on the form of "X OR Y", where X and Y are two distinct keywords. Because search requests are processed by a computer, syntax rules must be strictly followed when drafting a Boolean keyword search. In many search engines the logical operators "AND" and "OR" must be capitalized. Some search engines allow additional syntax that indicates requisite proximity of keywords or hierarchy within a specific Boolean query. Hierarchy within a Boolean query is usually designated with the use of parenthesis. The "(A OR B) AND © OR D)" query, for instance, finds a first set of records containing "A OR B" and a second set of records containing "C OR D", then finds records included in both the first set and the second set.

Using the Boolean operator "AND" in a search expression such as "X AND Y," will yield records which include both X and Y in the record. Using the Boolean operator "OR" in a search expression such as "X OR Y," will yield records which include either X or Y in the record. Using the Boolean operator "MINUS" in a search expression such "MINUS X" will yield records which do not include the term X in the record.

A query that is too narrow will result in less than the desired number of records. Correspondingly, a query that is too broad will result in greater than the desired number of records. Immediate user feedback on a specific query helps the searcher construct a better subsequent query. Hit count is perhaps the most effective form of feedback for constructing a better query. If a query is too narrow, the hit count will be very low, possibly even zero. If a query is too broad, the hit count will be very high. Hit count information is used with selected viewing of search results to alert the searcher of mistakes, such as incorrect category or segment choice, or otherwise assist the searcher in drafting more effective queries. Hit counts are generally displayed after a given query is executed. Hit counts are more useful when provided for each search term and each combination of search terms. Boolean Representation One, illustrated below in Table I, demonstrates how individual hit counts can be used for the Boolean keyword search for "(cat OR dog) AND (doctor OR veterinarian)".

TABLE I

Boolean Representation One

```
cat    --280-----------┐
                       |-- OR -- 774 ┐
dog    --494-----------┘             |
                                     |-- AND -- 4
veterinarian -- 34  ---┐             |
                       |-- OR -- 228-┘
doctor -- 194 --------┘
```

In the above example, the hit counts are as follows: in the database the term "cat" is included in 280 records; in the database the term "dog" is included in 494 records; in the database the term "veterinarian" is included in 34 records; in the database the term "doctor" is included in 194 records; in the database the term "cat" or "dog" is included in 774 records; in the database the term "veterinarian" or "doctor" is included in 228 records; and in the database the Boolean query for the Boolean expression "(cat OR dog) AND (doctor OR veterinarian)" results in the location of 4 records. If the Boolean expression is altered by the replacement of "dog" with "cow", the hit count change ripples through the Boolean expression's representation as shown in Boolean Representation Two, illustrated below in Table II.

TABLE II

Boolean Representation Two

```
cat    --280-----------┐
                       |-- OR -- 351 ┐
cow    -- 71-----------┘             |
                                     |-- AND -- 1
veterinarian -- 34  ---┐             |
                       |-- OR -- 228-┘
doctor -- 194 --------┘
```

Feedback from individual hit counts gives the searcher access to information normally hidden. Viewing individual hit counts, a searcher is better able to identify search terms that are too specific, too broad, or misspelled.

An additional search tool is hierarchical categorization. Instead of classifying records into separate categories, hierarchical categories classify records into both broad groupings and progressively narrower groupings. An example of hierarchical categorization is found in biology, where organisms are organized, from broadest to narrowest, by kingdom, phylum, class, order, family, genus, and species. Hierarchical categorization is commonly used in conventional internet search engines, such as those found at the Yahoo!™ and Altavista™ websites. To find information about a specific topic, a search engine user navigates from a list of broad categories through an increasingly more specific list of categories. Once the first category is selected, a search engine typically displays a lower level screen with another list of alternatives. Such navigation continues down through the various menus of alternatives having decreasing priority levels. At any point of the category navigation, a keyword or Boolean search can be performed upon the records in that category. Search results are only obtained from records located within the category searched. Most search engines only allow searches in one category at a time. To search a second category, the searcher must navigate up the hierarchical category tree and then down to the second category.

The limits of the hierarchical categorization method were addressed in the early 1990's by the Software Technology for Adaptable, Reliable Systems (STARS™) program, which was spearheaded by International Business Machines Corporation and the Boeing Company. One objective of the STARS™ program was to improve the classification system for software so that previously developed software could be reused in new software development efforts. One proposal resulting from the STARS™ program was multifaceted classification. Instead of assigning a record to a single category, multifaceted classification allows a record to belong to multiple categories. The multiple categories become part of a record's description, along with standard information for the record such as the title, the abstract (or keywords), the date, and author. Multifaceted classification improves the likelihood of locating relevant records. First, the searcher can take several different paths to locate the same record. Using the analogy of books in a library, multifaceted classification is able to place a single book on more than one shelf. Second, the multiple categories can be subjected to a Boolean query. Records relating to sports medicine could be found by searching for records included in both the sports category and the medicine category.

An internet search engine employing multifaceted classification has been developed by the NCBI (National Center for Biological Information), a division of the NLM (National Library of Medicine) at the NIH (National Institutes of Health) for the PubMed database of bibliographic information. The NCBI search engine includes a hierarchical category tree from which categories can be selected. The NCBI search engine permits the searcher to select multiple categories, entitled "MeSH Terms", from a hierarchical category tree. A MeSH Term can be linked by a logical AND or a logical OR with other MeSH Terms to create a Boolean expression. The Boolean expression of MeSH Terms can then be combined with additional terms to create the final query. The NCBI search engine also displays the hit count for each category and for each Boolean combination of categories.

Boolean logic, segment limitations, hit counts, hierarchical categorization, and multifaceted classification help the searcher create more effective queries, but at the cost of increased complexity. Often instruction manuals or a software program's help menu must be consulted to draft a query. Dialog™, for instance, publishes a "Bluebook" that contains detailed lists of segment codes for each of their many databases. Lexis-Nexis™ goes so far as to provide free online access and training seminars for students to overcome their search engine's initial learning curve. Addressing the complexity of search syntax, efforts have been made in the design of search engine software to reduce the amount of knowledge and experience needed to draft queries. The Lexis-Nexis™ search engine, for instance, provides searchers with the option of using a graphical user interface rather than their classical interface.

Most modern computer systems employ a graphical user interface rather than the more basic textual interface. In a graphical user interface, the user can run application programs, manipulate files, and perform most other necessary functions by manipulating images on the computer's display. This manipulation is accomplished by using cursor control keys and other keyboard keys or by using a cursor controlling peripheral device such as a joystick, mouse or trackball. A computer system 400 with a graphical user interface can be implemented as illustrated in FIG. 1. In FIG. 1, the computer system 400 includes a central processor unit (CPU) 401, a main memory 402, a video memory 403, a keyboard 404 for user input, supplemented by a conventional mouse 405 for manipulating graphic images as a cursor control device and a mass storage device 406, all coupled together by a conventional bidirectional system bus 407. The mass storage device 406 may include both fixed and removable media using any one or more of magnetic, optical or magneto-optical storage technology or any other available mass storage technology. The system bus 407 contains an address bus for addressing any portion of the memory 402 and 403. The system bus 407 also includes a data bus for transferring data between and among the CPU 401, the main memory 402, the video memory 403 and the mass storage device 406. Coupled to a port of the video memory 403 is a video multiplex and shifter circuit 408, to which in turn a video amplifier 409 is coupled. The video amplifier 409 drives a monitor or display 410 on which a graphical user interface is displayed. The video multiplex and shifter circuitry 408 and the video amplifier 409 convert pixel data stored in the video memory 403 to raster signals suitable for use by the monitor 410.

Graphical user interfaces for search engines use one or more screens to assist the searcher in the creation of a query. A sample query input screen 100 is illustrated in FIG. 2. The input screen 100 includes several labeled boxes capable of receiving textual inputs, including a client text box 102, a category text box 104, and a query text box 108. The client text box 102 is included such that individual searches can be billed to different clients and/or different projects. The category text box 104 is provided such that the searcher can input the category that will be searched. The query text box 108 is provided for the text of the query that will be executed in the selected category. The date parameters for a search are inputted using three boxes: a date parameter box 116, a start date box 120, and an end date box 122. Queries can be executed using the search button 114, saved using the save query button 124, or closed using the close button. 126. The searcher can obtain assistance in use of the input screen 100 by pressing the help button 128.

Buttons in the FIG. 2 input screen 100 prompt the display of additional information. A date parameter selection button 118 is used to display available date parameters, such as: "Date Is", "Date After", "Date Before", "Date Between", or "No Date Restriction". To find a record published between 1985 and 1989, the searcher would select "Date Between" for the date parameter box 116, "1985" for the start date box 120, and "1989" for the end date box 122. A segments button 110 displays the segment limitation available for the category selected in the category text box 104. A Boolean operators button 112 displays the Boolean operators available for connecting keywords in the query text box 108, such as: "OR", "AND", "NOT", and the special syntax used for proximity searches. A category walker button 106 is used to choose from a wide selection of available categories.

An exemplary category walker 140 is illustrated in FIG. 3. The category walker 140 includes a category tree viewing area 152, a category scroll bar 154, an OK button 146, a cancel button 148, and a category help button 150. The category viewing area 152 includes a sample hierarchical category tree represented graphically in a folder structure 142 with a root directory 144 and subdirectories arranged in alphabetical order. To navigate through the folder structure 142, the searcher scrolls through the alphabetical list of categories and clicks on the folder icons to view specific subdirectories of the selected category. To select a category, the searcher clicks the folder associated with the desired category using the conventional mouse 405 and then clicks the OK button 146. Once the OK button 146 is clicked, the category walker 140 closes and the category tree for the selected category appears in the category text box 104.

Saving a query is different from saving search results. A saved query contains all the information displayed on the input screen 100. When the searcher reopens a saved query, the query is displayed in the input screen 100 in the same manner it was originally displayed. The client information is displayed in the client text box 102, the category is displayed in the category text box 104, the query is displayed in the query text box 108, and any date information is displayed in the date parameter box 116, the start date box 120, and the end date box 122. The saved query displayed in the input screen 100 can be modified by the searcher and saved under another file name. Search result records are typically not saved in a format that can be manipulated by the search engine. Instead, search engines permit lists of search result records to be downloaded and saved as text documents. Individual search results can also be downloaded and saved as text documents. Once downloaded and saved on the searcher's computer, the list of search results can be manipulated using word processing software. To browse through the search results of a previously executed query using a search engine, a searcher must reexecute a saved query.

The database for a search engine can be local or remote. Local databases are generally marketed in the form of a CD-ROM accompanied by a proprietary search engine tailored for use with the particular data. Once a query is drafted, the proprietary software accesses records from the CD-ROM and displays the relevant records. The CD-ROMs can be used within a stand-alone computer or on a local area network accessible to multiple computers. As a CD-ROM is stored locally, use of the database does not require access to external transmission networks (e.g., telephone lines, ISDN, T-1, or DSL). Avoiding the need for external data, data from local databases can be retrieved faster and with greater reliability. CD-ROMs are not practical in some applications, however. CD-ROMs hold a limited amount of data, so they are not practical for databases that will not fit on a single CD-ROM (about 650 megabytes). The availability of CD-ROMs is also limited. Only widely used databases are available through normal marketing channels. Purchase of CD-ROMs is also impractical when the same information is available to the public over the internet.

Remote databases are searched in much the same way as a local database, but over a communication line. Remote access allows large databases to be centrally located and maintained, resulting in larger storage capability and lower costs. The remote database's need for transmission of data over a communication line, however, results in slower and less reliable retrieval of database information. Before the widespread growth of the internet, most remote databases were accessed by dial-up modems through a direct connection over a telephone line using proprietary data transfer protocols. With the rapid growth of the internet, more database services are accessible through the internet with a typical internet browser, such as Microsoft Internet Explorer or Netscape Communicator.

Access to remote databases through the internet follows the client-server model. The "client" is the searcher's computer. The server is the hardware and software maintained in a different location by the database provider. FIG. 4 illustrates how the client-server model is typically implemented. FIG. 4 includes a client 170, an internet 172, middleware 176, a first database 184, a second database 186, a third database 188, and a third party web server 199. The client 170 includes a browser 196 and a modem 198. The client 170 is coupled to the middleware 176 through a first communications route 174 traveling through the internet 172. The client 170 is also coupled to the third party web server 199 through a second communications route 197 through the internet 172. The middleware 176 is coupled to the first database 184 through a first database connection 190, to the second database 186 through a second database connection 192, and to a third database 188 through a third database connection 194.

The middleware 176 is used to connect the client 170 to database records. The middleware 176 includes a web server 178, a servlet 180, and a Java database connectivity (JDBC) layer 182. The web server 178 is used to control data transfer sent to and arriving from the client 170. Data is transferred between the client 170 and the middleware 176 by one of several data transfer protocols: hypertext markup language (HTML), simple text markup language (STML), extended HTML (XML), remote method invocation (RMI), common object request broker application (CORBA), or a proprietary protocol. The web server 178 receives data arriving from the client 170 and formats the data for the servlet 180. The web server 178 also receives data from the servlet 180, formats the data for the client 170, and sends the data to the client 170 through the internet 172. The servlet 180 is a Java program that receives the requests from the client 170, collects and processes the information requested, and then sends the information to the client 170 through the web server 178. The servlet 180 accesses databases through a JDBC layer 182. The JDBC layer 182 is a programming interface used to access information contained in the databases.

A search using the client-server model begins with a visit to the database provider's home page and ends with a visit to the third party web server 199. The database provider's home page includes instructions on where and how to conduct a search. The Yahoo!™ home page, for instance, includes a hierarchical category index, a box for entering a query, and a search button. Each of the categories listed on a given page is a hyperlink that will request a web page with subcategories for the selected category. Once satisfied with the category choice, the searcher types in a query and clicks the search button. The search request is formatted by the browser 196 and transmitted by the modem 198 across the internet 172 to the middleware 176. The web server 178 formats the request for the servlet 180, which sends a query to a given database through the JDBC layer 182. Records within the Yahoo!™ databases include a category field, a title field, an abstract field, and a universal resource locator (URL) field. The query sent to the database includes the category and keywords for the search. The database searches through the category field and keyword field for matching records. Search results are delivered back to the servlet 180 through the JDBC layer 182. The search results include a hit count total and summaries of each hit including the title, a short description, and a URL. After collecting the search results from a given database, the servlet 180 creates a new web page that is sent to the client through the web server 178 and over the internet 172. The client 170 receives the new web page from the internet 172 through the modem 198 and displays the new web page on the browser 196. The new web page displays the title, short description, and URL for each hit. The title of each hit is a hyperlink to the URL of the corresponding web page. By clicking the hyperlink, the browser is instructed to retrieve the web page found at the selected URL. The web page is then retrieved through the internet 172 from the third party web server 199 and displayed by the browser 196.

The design of internet search pages is constrained by the need to continually retrieve new web pages. Web pages are transmitted to the client 170 as HTML, which includes all the text and graphics via links displayed by the browser 196. The text and graphics displayed by the browser 196 cannot usually be altered unless a new page is requested and received over the internet. Each click of the computer mouse results in a noticeable delay, the length of which depends on the transmission speed of the modem 198 and the efficiency of the middleware 176. This time delay has resulted in the design of internet search engines that require fewer web pages for the execution of a search. The time delay has also resulted in fewer features, as each new feature requires the download of additional web pages for execution. While simplicity has resulted in fewer time delays, it has also resulted in less compelling graphical user interfaces. Each search looks the same as any other search.

SUMMARY OF THE INVENTION

A graphical user interface for building Boolean queries and viewing search results of the present invention preferably includes a workspace, a toolbar, and a menu bar. Within the workspace, a Boolean query is drafted using search cells and combination cells. The search cells each preferably have a search by icon, a text field, a hit count, a search cell flag, and a negate icon. The search cells are used to search records by category, keyword, numeric or date expressions. Categories are chosen with the assistance of a category walker. The combination cells each preferably have a combine icon, an expression field, and a hit count. Search cells and combination cells are moved about the workspace by a drag and drop operation of the computer mouse. The combination cell is a Boolean combination of two or more selected search cells and its expression field provides a textual representation of a Boolean combination. Combination cells combine the queries contained in individual search cells with logical AND operations, logical OR operations or logical MINUS operations.

The toolbar includes a search by group, a combine group, and an actions group. The search by group has a category button, a keyword button, and a date button. The category button, when selected, generates one search cell that searches by category with the assistance of the category walker. The keyword button, when selected, generates one search cell that searches by keyword. The date button, when selected, generates one search cell that searches by date. The combine group has a logical AND button, a logical OR button and a logical MINUS button. The logical AND button, when selected, generates one combination cell that combines selected search cells with a logical AND operation. The logical OR button, when selected, generates one combination cell that combines selected search cells with a logical OR operation. The logical MINUS button, when selected, generates one combination cell that combines selected search cells with a logical MINUS operation The actions group has a remove button, a results button, an expand/collapse button and a quit button. The remove button, when selected, removes selected combination cells and selected search cells from the workspace. The results button, when selected, executes the query defined by the selected combination cell and creates a results tab. The expand/collapse button collapses search cells together into a combination search cell or expands a selected combination search cell into the original search cells which were utilized to generate the combination cell. The quit button, when selected, closes the window. When the results tab is selected, the workspace displays the search results, including a title, a media type, and a location. In the preferred embodiment of the invention, the location of records is preferably a URL address.

The menu bar includes a session menu, a collection menu, a query menu, a select menu, and a help menu. A session treats the query represented in the workspace as a computer file. The session menu includes a new session option, an open session option, a save session option, a close session option, and an exit option. A collection treats the search results represented in the workspace as a computer file. The collection menu includes a new collection option, an open collection option, a merge collection option, a save option, and a close collection option. The query menu includes a search by category option, a search by keyword option, a search by numeric or date option, a combine by logical AND option, a combine by logical OR option, a combine by logical MINUS option and an execute search option. The select menu includes a select all option, an unselect all option, and a selection option. The help menu includes an index option and an about option.

In the preferred embodiment of the invention, the Boolean logic is depicted with the use of combination brackets. The workspace of the preferred embodiment includes two columns. The left column includes a stack of search cells; the right column is an area for the combination brackets or braces. The combination brackets graphically represent Boolean combinations of search cells. Each combination bracket is labeled with a logical AND, a logical OR or a logical MINUS. The contents of each combination bracket is controllable by the use of movable graphical pins that are located between each pair of search cells. The combination bracket can be represented by use of a rectangular bracket, a square bracket, or a curly brace.

In a further alternative embodiment of the invention, the Boolean query is depicted in a folder tree hierarchy. Search folders and combination folders are used to depict search cells and combination cells, respectively. Search folders contain the same information as search cells, but search folders can be toggled to appear as small folder icons within the workspace. Combination folders are represented as small folder icons containing a logical AND icon, a logical OR icon or a logical MINUS icon. Search folders are shown to be included within combination folders through the use of the folder tree hierarchy, just as computer files are shown to be included within a folder in a typical file manager program, such as Microsoft Windows Explorer™. Search folders and combination folders can be moved about the workspace using a drag and drop motion of the computer mouse.

In the preferred embodiment of the invention, a local client computer uses an internet browser and is coupled to a remote server through the internet. To minimize communication delays across the internet, an applet is run on the local client to perform most graphical display manipulations prompted by the searcher's manipulation of the search cells, the combination cells, the toolbar, and the menu. The applet, for instance, processes and displays the graphics depicting insertion, flagging, movement, and deletion of search cells within the workspace. The remote server is then used to execute queries received over the internet from the local client and deliver search results back to the local client over the internet.

BRIEF DESCRIPTION OF THE DRAWINGS

FIG. 8A to 8H detail how the Boolean graphic of the second window is manipulated to generate a hierarchical Boolean query of the present invention.

DETAILED DESCRIPTION OF THE PREFERRED EMBODIMENT

The graphical user interface for building Boolean queries and viewing search results of the present invention is an improved implementation of a search engine wherein the search terms and Boolean logic making up a Boolean query are displayed in a graphical format. The preferred embodiment includes two window designs for graphically representing Boolean queries. The graphical user interface of the present invention is capable for use on both a stand alone computer and in a client-server model. When used in a client-server model, the search engine of the present invention employs an applet operating on the client computer system to locally modify the client's graphical display in response to computer mouse and keyboard commands.

Figure 5:
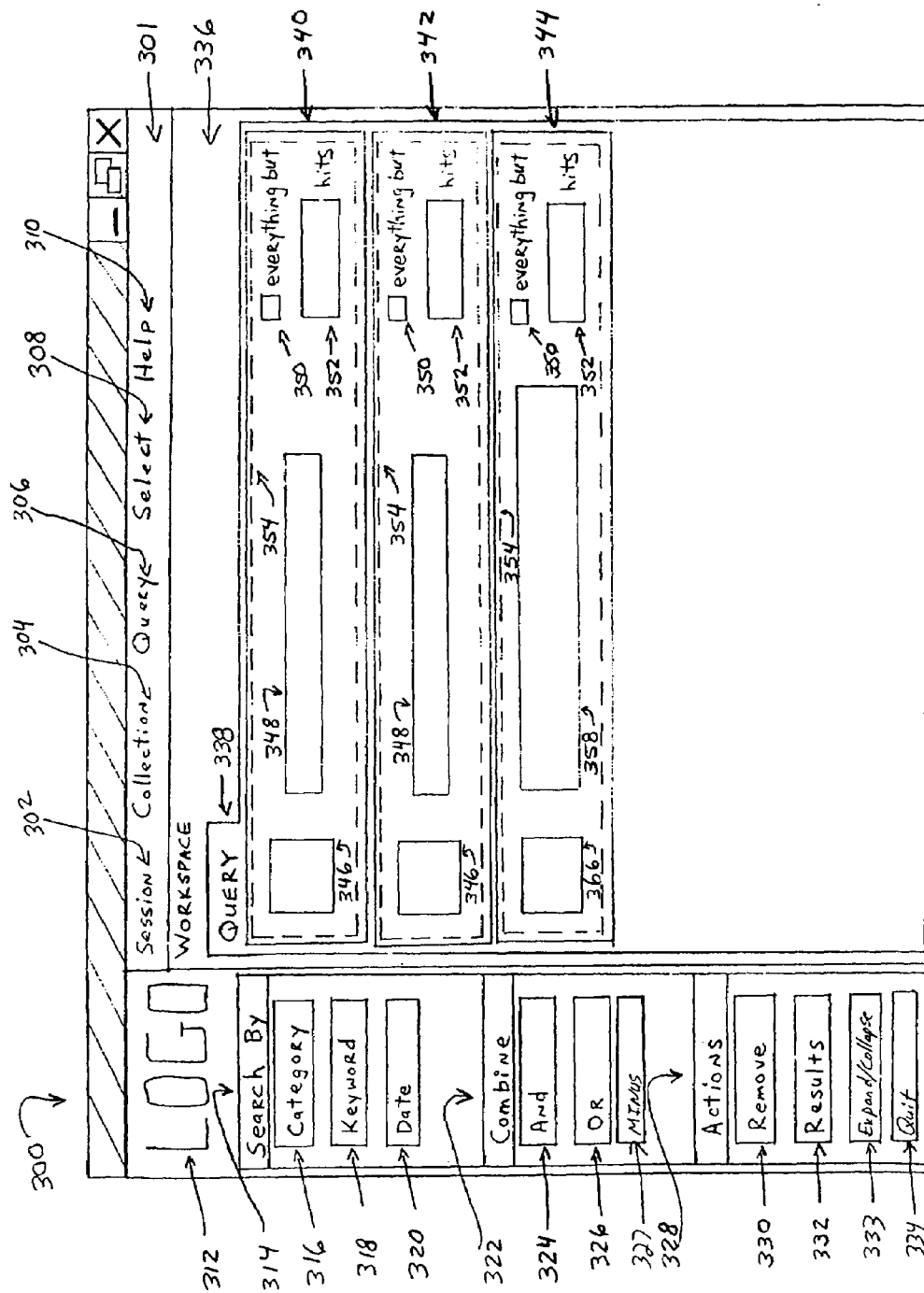
FIG. 5 illustrates a first window for graphical representation of a Boolean query using search cells and combination cells of the present invention.

The first window 300 for graphically representing a Boolean query in the graphical user interface of the present invention is illustrated in FIG. 5. The first window 300 preferably includes three main areas: a menu bar 301 along the top of the first window 300, a first tool bar 303 along the left side of the first window 300, and a first workspace 336. The menu bar 301 preferably includes a session menu 302, a collection menu 304, a query menu 306, a select menu 308, and a help menu 310. The first tool bar 303 preferably includes three tool groups: a search by group 314, a combine group 322, and an actions group 328. The first tool bar 303 also preferably includes a company logo 312. The search by group 314 includes a category button 316, a keyword button 318, and a date button 320. The combine group 322 includes a logical AND button 324, a logical OR button 326 and a logical MINUS button 327. The actions group 328 includes a remove button 330, a results button 332, an expand/collapse button 333 and a quit button 334. The first workspace 336 includes a query tab 338, a search cell A 340, a search cell B 342, and a combination cell 344. The search cell A 340 and the search cell B 342 both include a text field 348, a negate icon 350, a hit count 352, a search by icon 346, and a cell flag 354. The combination cell 344 includes an expression field 358 and a combine icon 366. Like the search cells 340 and 342, the combination cell also includes: a negate icon 350, a hit count 352 and a cell flag 354.

The negate icon 350 is a check box, which toggles between an activated state and a deactivated state by a click with the computer mouse. The cell flag 354 of a specific cell is activated by clicking on the cell perimeter with the computer mouse and deactivated by a second click. The cell flag 354 indicates whether or not a corresponding search or combination cell is selected. The search by icon 346 within the search cells 340 and 342 indicates the field that is currently being searched. Separate icons are used for category, keyword, and date. Specific categories are chosen by first clicking the category button 316 and then choosing a specific category from a hierarchical category tree using a category walker. Media type is chosen using the category walker. The combine icon 366 indicates whether the combination cell 344 is combining search cells using a logical OR operator, a logical AND operator or a logical MINUS operator. The preferred pull-down options of each of the menus within the menu bar are set forth below in Table III.

TABLE III

| Pull-Down Options of Menu Bar | |
| --- | --- |
| Menu Item | Pull-Down Options |
| Session Menu | New |
| | Open |
| | Save |
| | Close |
| | Exit |
| Collection Menu | New |
| | Open |
| | Merge |
| | Save |
| | Close |
| Query Menu | by Category |
| | by Keyword |
| | by Date |
| | Combine A.B. |
| | Execute |
| Select | Select All |
| | Unselect All |
| | Invert Selection |
| Help Menu | Index |
| | About |

A query is created in the first window 300, starting with a blank first workspace 336. The blank first workspace 336 is created using the "New" pull-down option from the session menu 302 (and also when the first search window 300 is first opened). Search cells are added to the first workspace 336 one at a time using the category button 316, the keyword button 318, or the date button 320. Selecting the category button 316 opens a search cell with a category icon as the search by icon 346, selecting the keyword button 318 opens a search cell with a keyword icon as the search by icon 346, and selecting the date button 320 opens a search cell with a date icon as the search by icon 346. When first opened a new search cell has a blank text field 348, unchecked negate icon 350, and a zero hit count 352. If the search cell is created using the category button 316, a category walker opens in a small, separate window. The category is chosen from navigating through the category tree using the category walker, selecting a given category, and pressing the OK button. The chosen category is automatically placed within the text field 348. The searcher checks the negate icon 350 if he or she desires to locate every record outside the chosen category. Otherwise, if the negate icon 350 is not checked then only records within the category will be included in the search.

If the search cell is created using the keyword button 318, the searcher must enter single keywords into the text field 348. The searcher checks the negate icon 350 if he or she desires to locate every record not containing the given keyword. Otherwise, if the negate icon 350 is not checked then only records containing the keyword will be located. If the search cell is created using the date button 320, a search cell containing a drop down box and two date fields is created. The drop down box allows the searcher to select among the following choices: no date restriction, date is, date after, date before, date between. No dates need be entered in either of the two date fields if "no date restriction" is chosen. Only the first date field is used if the selected drop down option is either "date is," "date after," or "date before." If the "date between" option is chosen, the first date field is used as the starting date and the second date field is used as the ending date. Each search cell has a separate hit count 352. The searcher checks the negate icon 350 if he or she desires to locate every record outside the given date range. Otherwise, if the negate icon 350 is not checked then only records within the date range will be located.

Search cells can be combined into a Boolean query using the combination cell 344. Selecting the logical AND button 324 creates a combination cell with a logical AND combine icon 366. Selecting the logical OR button 326 creates a combination cell with a logical OR combine icon 366. Selecting the logical MINUS button 327 creates a combination cell with a logical MINUS combine icon 366. The expression field 358 of a combination cell 344 is dictated by the content of the search cells that are flagged prior to selecting the logical AND button 324, the logical OR button 326 or the logical MINUS button 327. If "A" and "B" represent selected search cells, the content of the expression field 358 for a combination cell created with a logical AND button 324 is of the form: "A" AND "B." If "A" and "B" represent selected search cells, the content of the expression field 358 for a combination cell created with a logical OR button 326 is of the form: "A" OR "B." If "A" and "B" represent selected search cells, the content of the expression field 358 for a combination cell created with a logical MINUS button 327 is of the form "A" MINUS "B." The selected search cells are removed from the first workspace 336 upon the creation of the combination cell 344 when the collapse option button 333 is selected, giving the appearance that the search cells have collapsed into the combination cell 344. After a combination cell 344 has been collapsed, it can be expanded by selecting the combination cell 344 and then selecting the expand option button 333 which will expand the combination cell into the original search cells which were used to create the combination cell. Once a combination cell 344 is created, it can be combined with other search cells (or other combination cells) to create an additional combination cell.

The first workspace 336 treats queries as a file. Like a word processing file, queries within the first workspace 336 can be saved, closed, opened, and inserted within other queries. Queries are saved by selecting "Save" from the session menu 302. Queries can be closed by selecting "Close" from the session menu 302 and reopened by selecting "Open." Selecting "Insert" from the session menu 302 opens a dialog box from which the searcher can import a saved search into the present query. This method allows the searcher to combine the query represented on the first workspace 336 with a previously drafted query. Once the previously drafted query is inserted into the first workspace 336, the searcher can delete unwanted search cells or combination cells to create a third query. Cells, and any associated search results, can be deleted from the first workspace 336 by first flagging the cells then selecting the remove button 330. Cells can be moved within the first workspace 336 by selecting a cell with the computer mouse and dragging the cell to a new location. Movement of cells, while not affecting the outcome of a query, is helpful in the visualization of the query's content. Moving related cells such that they are adjacent prior to creating a combination cell, for instance, assists the searcher in the selection of the cells. The searcher may also desire to place two cells next to one another in order to compare and contrast search terms in light of hit counts.

Figure 6:
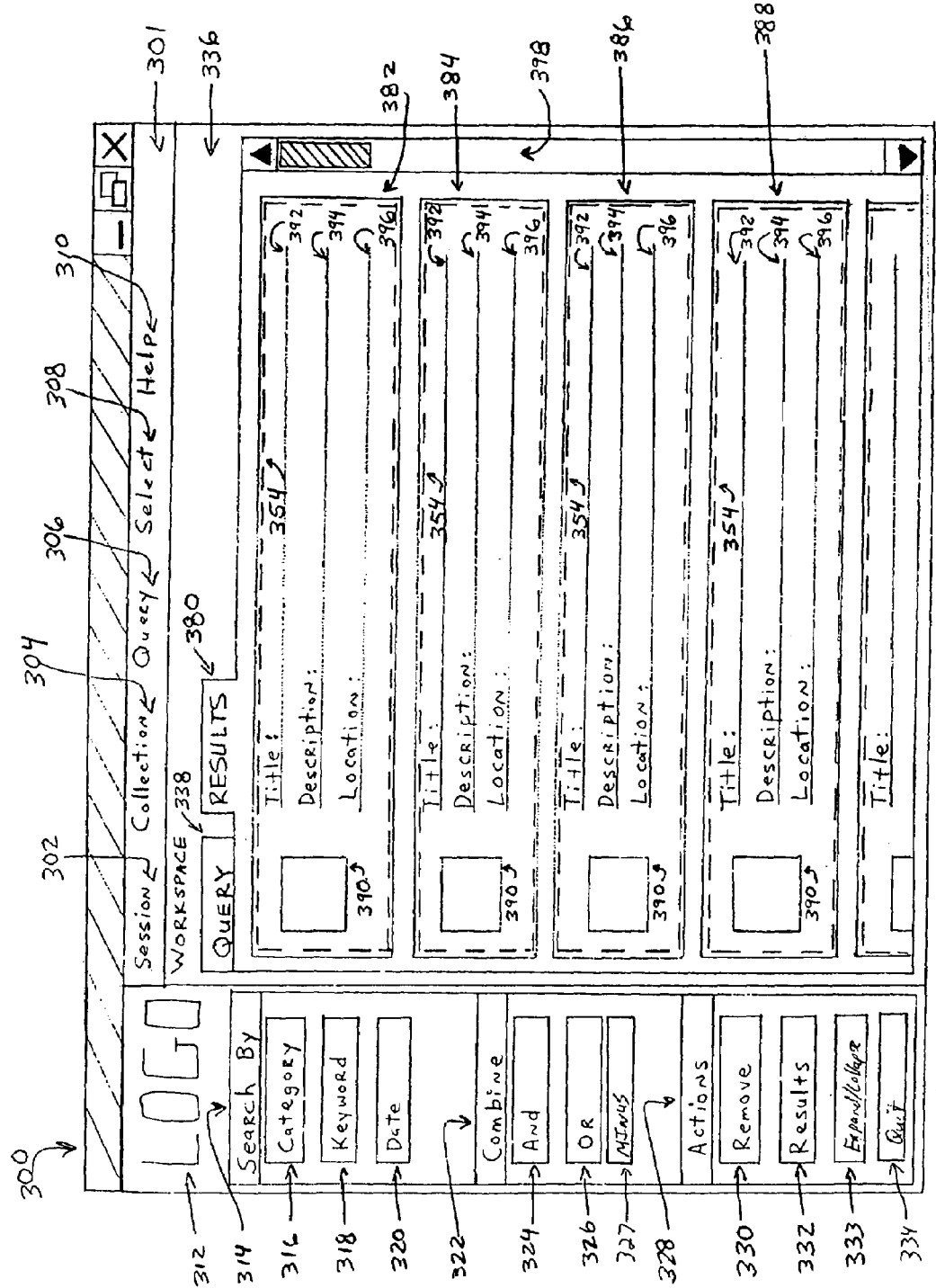
FIG. 6 illustrates a first window for display of search results within a plurality of result cells of the present invention.

To execute a query in the first workspace 336, the searcher first selects an appropriate cell then selects the results button 332. When the search is executed, the results from that search will be displayed in the first workspace 336. Executing a search causes a change in the appearance of the workspace 336. As shown in FIG. 6, executing a search changes the appearance of the first workspace 336, but preferably does not change the appearance of the menu bar 301 or the first tool bar 303. In the first workspace 336, each executed search has a results tab 380 and a plurality of result cells. The number of result cells is equal to the hit count 352 of the search cell or combination cell flagged for search execution. In the example illustrated in FIG. 6, result cell one 382, result cell two 384, result cell three 386, and result cell four 388 are displayed. Additional result cells can be viewed in the first workspace 336, if available, by scrolling down the window of the first workspace 336 using the results scroll bar 398. Each result cell includes a media type icon 390, a title 392, a description 394, a location 396, and a cell flag 354. The media type icon 390 is used to designate the type of record, such as text, jpg, gif, tiff, or pdf. The location 396 designates the URL of the record if the record is located remotely on the world wide web or the file name if the record is located locally on a CD-ROM.

The first workspace 336 treats search results as a file, which is referred to as a "collection." Collections can be saved, closed, opened, and merged within other collections. Collections are saved by selecting "Save" from the collection menu 304. Collections can be closed by selecting "Close" from the collection menu 304 and reopened by selecting "Open." Selecting "Merge" from the collection menu 304 opens a dialog box from which the searcher can import search results from another collection into the present collection. This method allows the searcher to combine the collection represented within the first workspace 336 with a previously executed search collection. Once the previously drafted collection is merged into the first workspace 336, the searcher can delete unwanted result cells to create a third collection. Result cells can be deleted from the first workspace 336 by first selecting the desired result cells then selecting the remove button 330. Result cells can be moved and reordered within the first workspace 336 by selecting a result cell with the computer mouse and dragging the result cell to a new location. Movement of result cells, while not affecting the content of a collection, is helpful in the visualization of the collection's scope. Moving related result cells such that they are adjacent prior to download, for instance, assists the searcher in the organization of the downloaded records. The searcher may also desire to place two result cells next to one another in order to compare and contrast description 394 and location 396.

Figure 7:
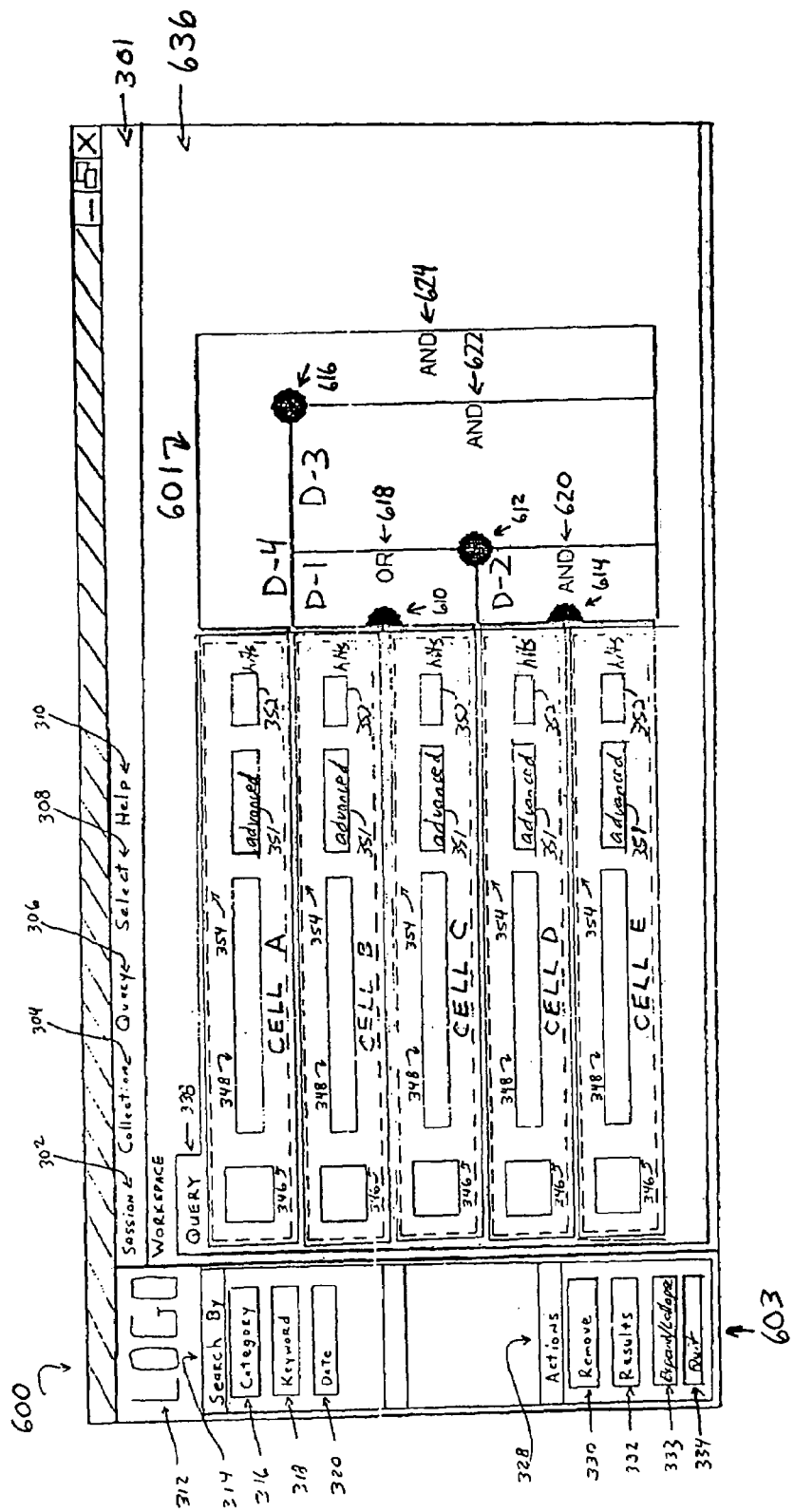
FIG. 7 illustrates a second window for graphical representation of a Boolean query using search cells and a Boolean graphic of the present invention.
Figure 10:
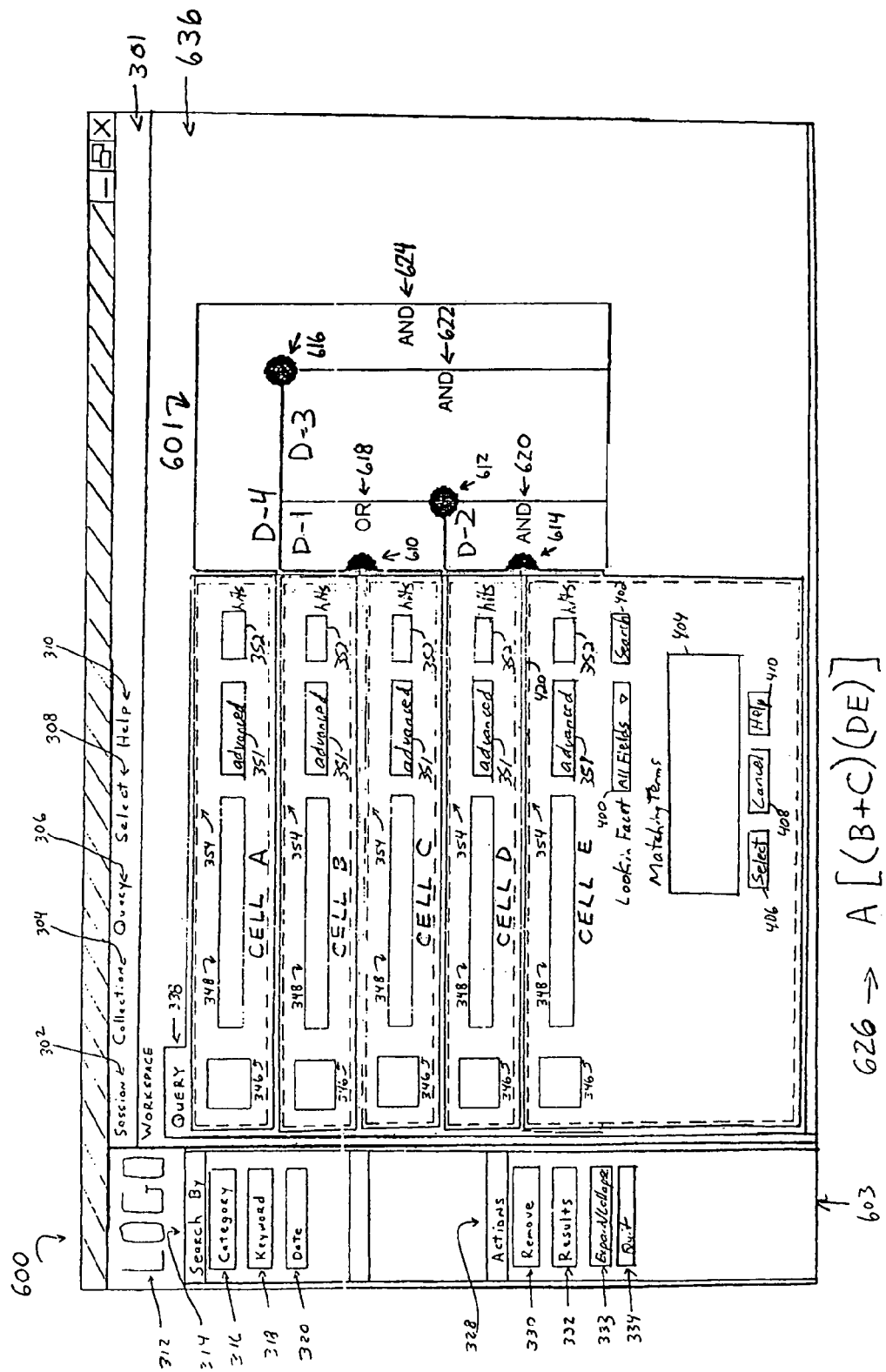
FIG. 10 illustrates a search cell with a selected advanced button in which the additional features are shown.

A further alternative embodiment of the invention is illustrated in a second window 600 in FIG. 7. The second window 600 is similar to the first window 300 illustrated in FIG. 5, but additionally includes a Boolean graphic 601 in the second workspace 636. The first window 300 and the second window 600 have identical menu bars 301. The first tool bar 303 of the first window 300 and the second tool bar 603 of the second window 600 both have a search by group 314 and an actions group 328, but the second tool bar 603 does not include the combine group 322 located in the first tool bar 303. The search cells do not include the negate icon 350. The search cells within the second window 600 do include an advanced button 351, which when selected causes additional features to be displayed within the search cell. A search cell 420 in which the advanced button 351 has been selected is illustrated in FIG. 10. When the advanced button 351 is selected, the search cell 420 is expanded and additional features including a facet display 400, a search button 402, a matching terms window 404, a select button 406, a cancel button 408 and a help button 410. The facet display 400 displays different fields for selection in which searches can be conducted. By selecting the facet field 400, a list of available fields pops up within the display providing the user the ability to select one or more of the fields. When the user selects the search button 402, the search, as specified within the search cell, is performed. When search terms are entered into the text field 348, additional potentially matching terms are displayed in the matching terms window 404. From this matching terms window 404, a user has the ability to select additional terms to be included in the text field 348. By selecting the advanced button 351 within the search cell 420 a second time, the search cell 420 will be minimized so that the additional features are hidden.

The Boolean graphic 601 is used to graphically display the hierarchical Boolean combination of search cells. The hierarchy of the Boolean graphic 601 reads from sub-equations on the left to progressively more senior equations to the right. Use of the Boolean graphic 601 avoids the need for hierarchical Boolean syntax, which is designated by the use of parenthesis, brackets, and curly braces. The Boolean graphic 601 illustrated in FIGS. 7-10 includes rectangular brackets. Within the Boolean graphic of the preferred embodiment of the present invention, curly braces are used to display the hierarchical Boolean combination of search cells.

In the second workspace 636, a Boolean combination of five search cells is displayed. The five search cells are labeled cell A, cell B, cell C, cell D, and cell E. To the right of the search cells are four rectangular brackets: D-1, D-2, D-3, and D-4. D-1 is to the right of cell B and cell C. The bracket D-2 is to the right of cell D and cell E. The bracket D-3 is to the right of the bracket D-1 and the bracket D-2. The bracket D-4 has two legs. The first leg of the bracket D-4 is to the right of cell A and above the bracket D-1 and the bracket D-3. The second leg of the bracket D-4 is to the right of the bracket D-3. Each rectangular bracket has a Boolean selector: the bracket D-1 has a first Boolean selector 618 labeled "OR"; the bracket D-2 has a second Boolean selector 620 labeled "AND"; the bracket D-3 has a third Boolean selector 622 labeled "AND"; and the bracket D-4 has a Boolean selector 624 labeled "AND". Any of the Boolean selectors 618, 620, 622 and 624 can be toggled between "AND," "OR" and "MINUS" by clicking on the Boolean selector with the computer mouse.

The Boolean graphic 601 also includes four pins: a pin AB 616 representing the relationship between the adjacent search cells A and B, a pin BC 610 representing the relationship between the adjacent search cells B and C, a pin CD 612 representing the relationship between the adjacent search cells C and D, and a pin DE 614 representing the relationship between the adjacent search cells D and E. A final Boolean equation summarizing the exemplary Boolean expression displayed in the second workspace 636 is represented by the Boolean expression A[(B+C)(DE)] 626, in which an OR operation is performed on the search cells B and C, an AND operation is performed on the search cells D and E, the results of the two operations are ANDed together to form a first result, and an AND operation is performed on the first result and search cell A.

Creation of a Boolean equation using the Boolean graphic 601 is illustrated in FIGS. 8A to 8D. FIG. 8D represents the same Boolean equation found in the Boolean graphic 601 of FIG. 7 and includes cut-away views of the five search cells (cell A, cell B, cell C, cell D, and cell E) in a left column, rectangular brackets to the right of the five search cells, and the four pins (pin AB 616, pin BC 610, pin CD 612, and pin DE 614). Before the manipulation of any pins as illustrated in FIG. 8A, all four pins are adjacent to the right border of the search cells to which they correspond, the Boolean graphic 601 includes only a single rectangular bracket A-1 with Boolean selector A-1 519, and the Boolean equation is ABCDE 501, which performs an AND operation on all of the search cells A, B, C, D, and E. To move a pin, the searcher uses a drag and drop action with a cursor control device. FIG. 8B illustrates the appearance of the Boolean graphic 601 after the pin CD 612 has been moved to the right. The movement of pin CD 612 results in the generation of three rectangular brackets: the bracket B-1 with Boolean selector B-1 544, the bracket B-2 with Boolean selector B-2 546, and the bracket B-3 with Boolean selector B-3 548. The resulting Boolean equation is (ABC)(DE) 521, which can be simplified as ABCDE and is still an AND operation performed on all of the search cells A, B, C, D, and E. When the Boolean selector C-1 574 is clicked, the Boolean logic of the Boolean graphic 601 becomes (A+B+C)(DE) 551, as illustrated in FIG. 8C. FIG. 8C includes three rectangular brackets: the bracket C-1 with Boolean selector C-1 574, the bracket C-2 with Boolean selector C-2 576, and the bracket C-3 with Boolean selector C-3 578. When the pin AB 616 is moved to the right past the pin CD 612 as illustrated in FIG. 8D, the Boolean graphic is altered such that four rectangular brackets are defined: the bracket D-1 with Boolean selector D-1 618, the bracket D-2 with Boolean selector D-2 620, the bracket D-3 with Boolean selector D-3 622, and the bracket D-4 with Boolean selector D-4 624. The resulting Boolean equation is A[(B+C)(DE)] 581, in which an OR operation is performed on the search cells B and C, an AND operation is performed on the search cells D and E, the results of the two operations are ANDed together to form a first result, and an AND operation is performed on the first result and search cell A.

The Boolean graphic 601 can also be represented with the use of square brackets. FIGS. 8E to 8H illustrate the same four Boolean equations graphically represented by FIGS. 8A to 8D, respectively. Except for the use of square brackets instead of rectangular brackets, FIGS. 8E to 8H are identical to FIGS. 8A to 8D, respectively. FIGS. 8E to 8H include the cut-away views of the five search cells (cell A, cell B, cell C, cell D, and cell E) in a left column, square brackets to the right of the five search cells, and the four pins (pin AB 616, pin BC 610, pin CD 612, and pin DE 614). FIG. 8E includes only a single square bracket E-1 with Boolean selector E-1 712. FIG. 8F includes three square brackets: the bracket F-1 with Boolean selector F-1 736, the bracket F-2 with Boolean selector F-2 738, and the bracket F-3 with Boolean selector F-3 740. FIG. 8G includes three square brackets: the bracket G-1 with Boolean selector G-1 766, the bracket G-2 with Boolean selector G-2 768, and the bracket G-3 with Boolean selector G-3 770. FIG. 8H includes four square brackets: the bracket H-1 with Boolean selector H-1 786, the bracket H-2 with Boolean selector H-2 788, the bracket H-3 with Boolean selector H-3 798, and the bracket H-4 with Boolean selector H-4 799. Pins are moved and Boolean selectors are toggled in the same manner whether the Boolean graphic 601 employs rectangular brackets or square brackets. Square brackets can also be replaced by angle brackets, braces, or parenthesis.

Figure 9:
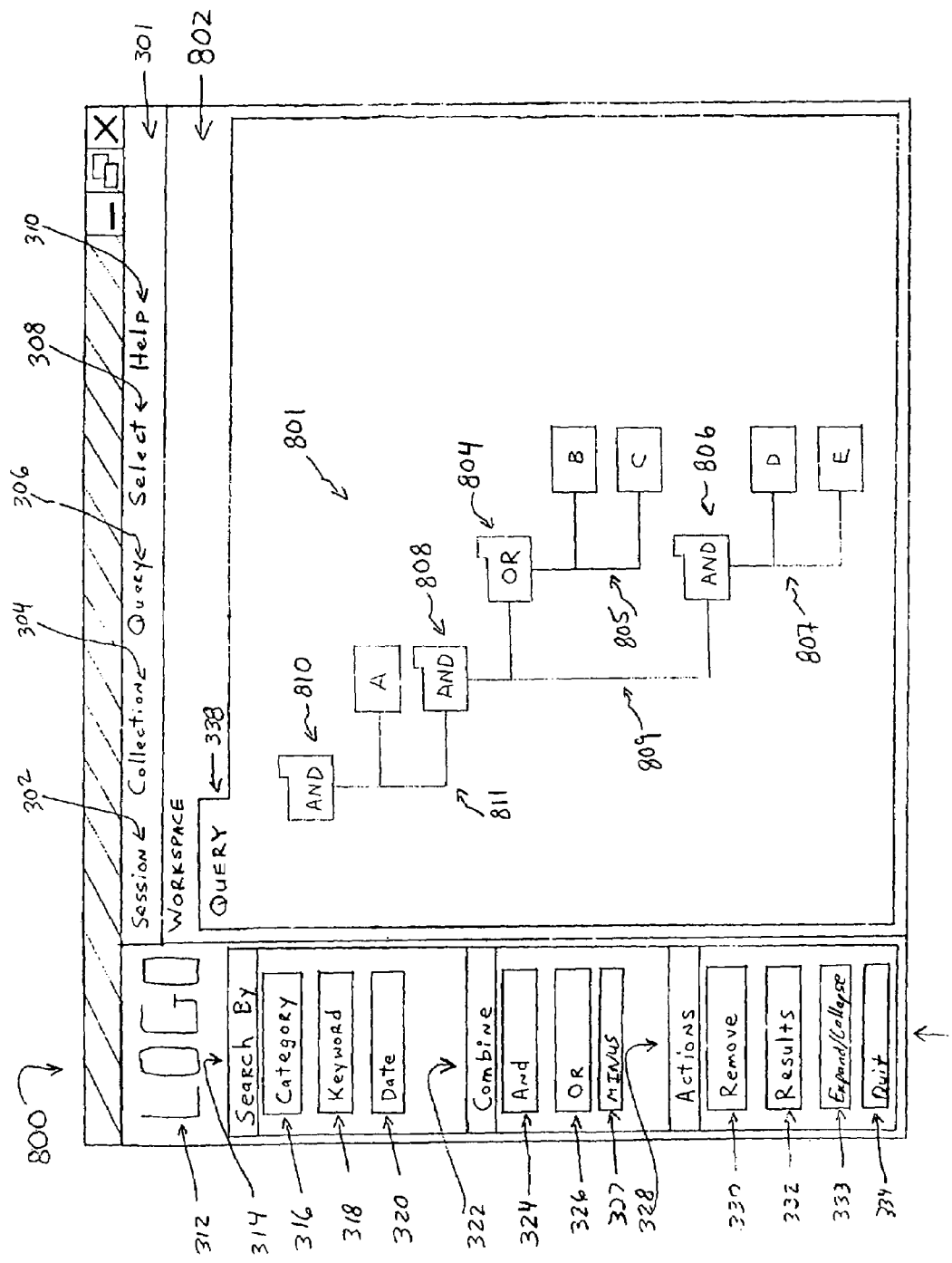
FIG. 9 illustrates a third window that includes a Boolean folder tree used to generate the hierarchical Boolean query of the present invention.

A second alternate embodiment of the invention is illustrated in a third window 800 in FIG. 9. The third window 800 is similar to the first window 300 of FIG. 5, but with the replacement of a Boolean folder tree 801 in the third workspace 802. The first window 300 and the third window 800 have identical menu bars 301 and first tool bar 303. The Boolean folder tree 801 is used to graphically display the hierarchical Boolean combination of search cells. The hierarchy of the Boolean folder tree 801 follows the general folder/sub-folder hierarchy of folder trees. As with use of the Boolean graphic 601 shown in FIG. 7, the Boolean folder tree 801 avoids the need for hierarchical Boolean syntax, which is designated by the use of parenthesis, brackets, and curly braces.

In the third workspace 802, a Boolean combination of five search cell icons is displayed. The five search cell icons are represented by small rectangles and labeled A, B, C, D, and E. The five search cell icons are arranged in a folder tree structure with four combination folders: a junior OR folder 804, a junior AND folder 806, a senior AND folder 808, and a top AND folder 810. The junior OR folder 804 includes the search cell icons B and C, as indicated by the first folder branch 805 connections. The junior AND folder 806 includes the search cell icon icons D and E, as indicated by the second folder branch 807. The senior AND folder 808 includes the junior OR folder 804 and the junior AND folder 806, as indicated by the third folder branch 809. The top AND folder 810 includes the search cell icon A and the senior AND folder 808, as indicated by the fourth folder branch 811.

A query is created in the third window 800, starting with a blank third workspace 802. The blank third workspace 802 is created using the "New" pull-down option from the session menu 302 (and also when the first search window 300 is first opened). Search cells identical to those shown in the first workspace 336 of FIG. 5 are added to the third workspace 802 one at a time in the same manner they are added to the first workspace 336. Once created, search cells located in the third workspace 802 can be reduced into the small, rectangular search cell icons shown in FIG. 9 by double clicking a given search cell. In corollary, double clicking search cell icons will expand the search cell icon into a complete search cell.

Search cell icons can be combined into a Boolean query using combination folders by first flagging specific search cell icons, then selecting the logical AND button 324, the logical OR button 326 or the logical MINUS button 327. Selecting the logical AND button 324 creates a combination folder labeled "AND," selecting the logical OR button 326 creates a combination folder labeled "OR" and selecting the logical MINUS button 327 creates a combination folder labeled "MINUS." Details of a combination folder can be reviewed by double clicking the specific combination folder, expanding the folder into a combination cell 344 as shown in FIG. 5 or selecting the combination cell and then clicking the expand/collapse button 333. Combinations cells, in corollary, can be reduced to combination folders by double clicking or selecting the combination cell and then clicking the expand/collapse button 333. Search cell icons and combination folders can be dragged and dropped within the third workspace 802 to alter the Boolean query. Search cell icons and combination folders can also be deleted by flagging the items to be deleted then selecting the remove button 330. As in the first workspace, the third workspace 802 treats queries as a file. Queries within the third workspace 802 can be saved, closed, opened, and merged within other queries. Along with the query, a user can also save a comments dialog, allowing the user to save notes and thoughts about the search query. Queries can also be executed in the third workspace 802 by selecting the results button 322, which will change the appearance of the workspace 802 as shown in FIG. 6.

Due to extensive searcher interaction with the graphical user interface, local execution of the applet on the client increases the effectiveness of the invention. An applet is a small Java software program that can be run by an internet browser on multiple computer platforms. Applets can be permanently saved on the hard drive of the client computer as a browser plugin and executed as a resident applet. Applets can also be downloaded and executed as a server transferred applet that is not saved within the browser. Download time for the applet is negligible because the applet is not a stand alone program but rather an augmentation of the client's browser. The size of the applet can be as small as 500 kilobytes. If the applet were not executed on the client, each page refresh would have to be requested from the server over a communication line, assembled by the server, and sent back to the client over a communication line, resulting in significant time delays with each interaction between the searcher and the invention's graphical user interface. With the use of the applet, the searcher can insert cells, move pins, and enter text in real time. The applet also allows the searcher to continue with their modification of the graphical user interface while queries are delivered to the server and search results are sent back to the client. Using an applet, the searcher commands the resources of a remote server with the speed of a local client.

Figure 1:
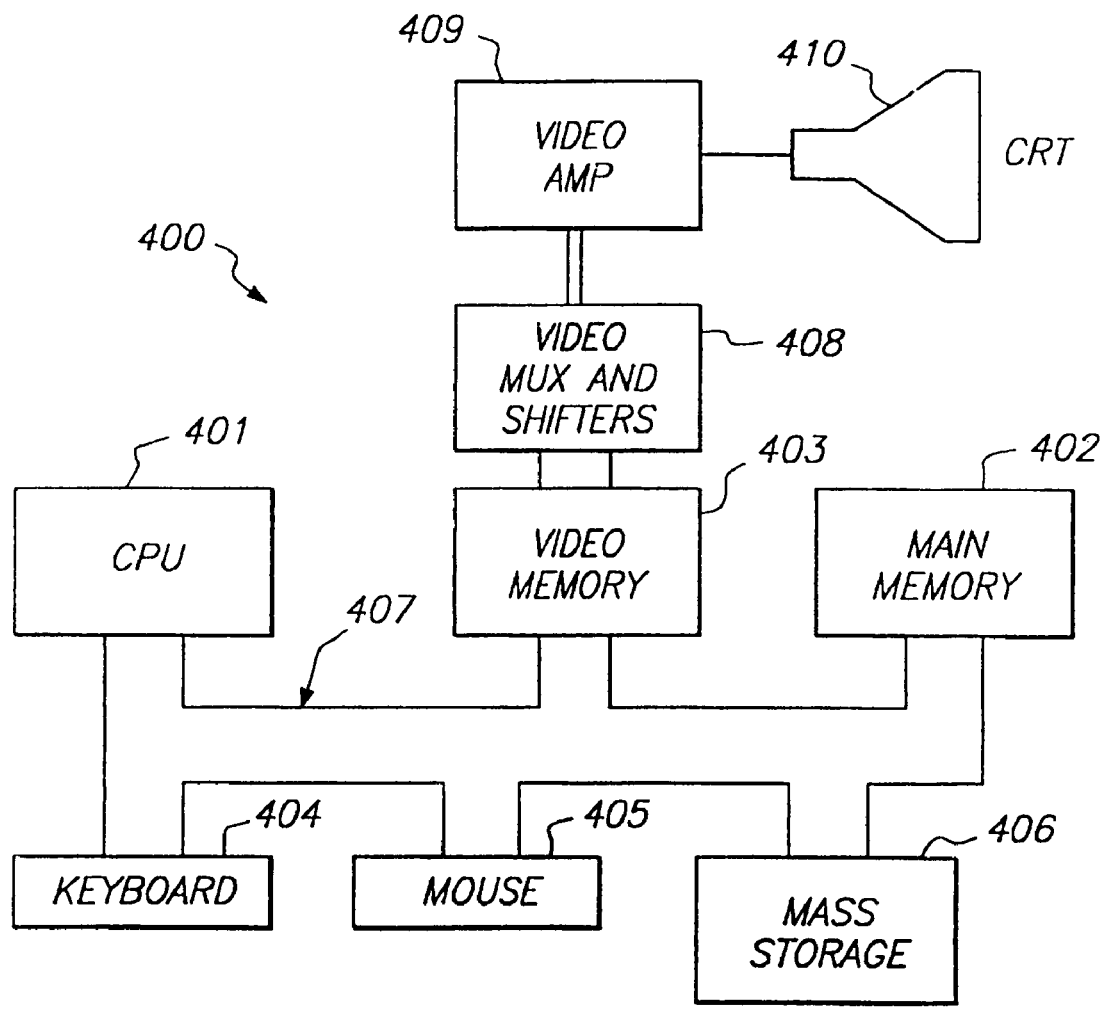
FIG. 1 illustrates a computer system with a graphical user interface, including a CRT, a keyboard, and a computer mouse.
Figure 2:
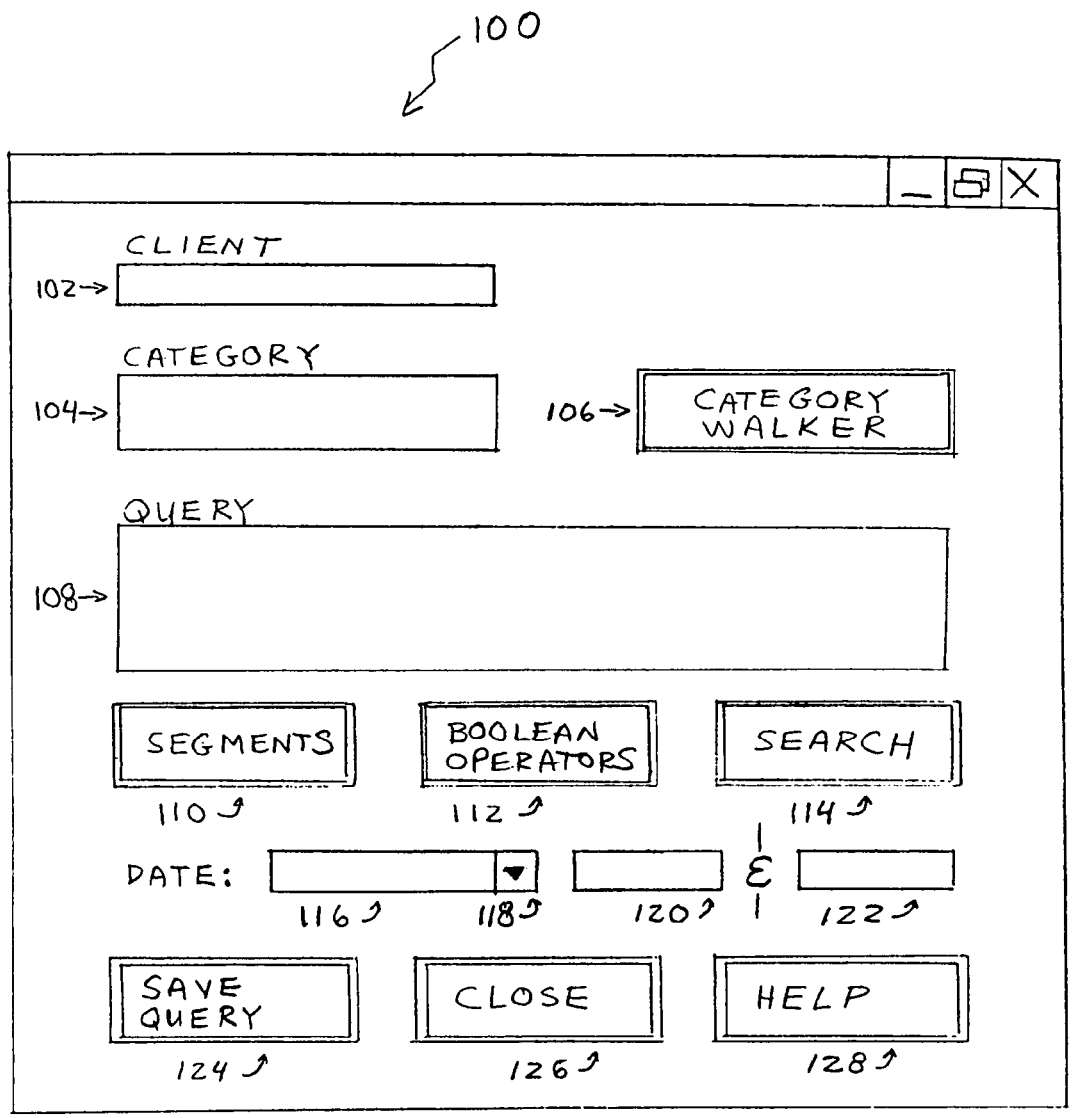
FIG. 2 illustrates a graphical user interface window used to assist a searcher in the creation of a query.
Figure 3:
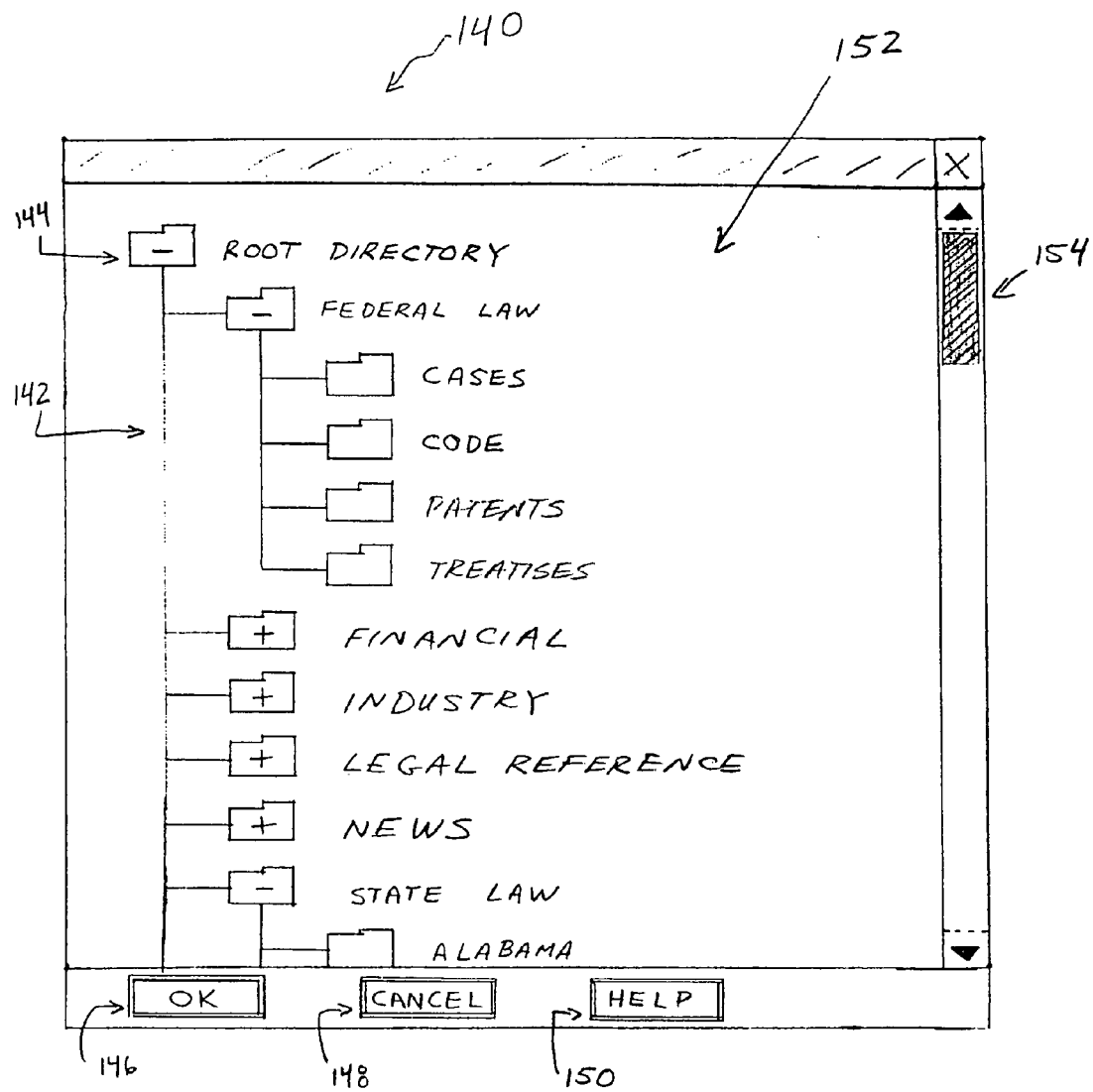
FIG. 3 illustrates a category walker designed to assist in the navigation through a category tree.
Figure 4:
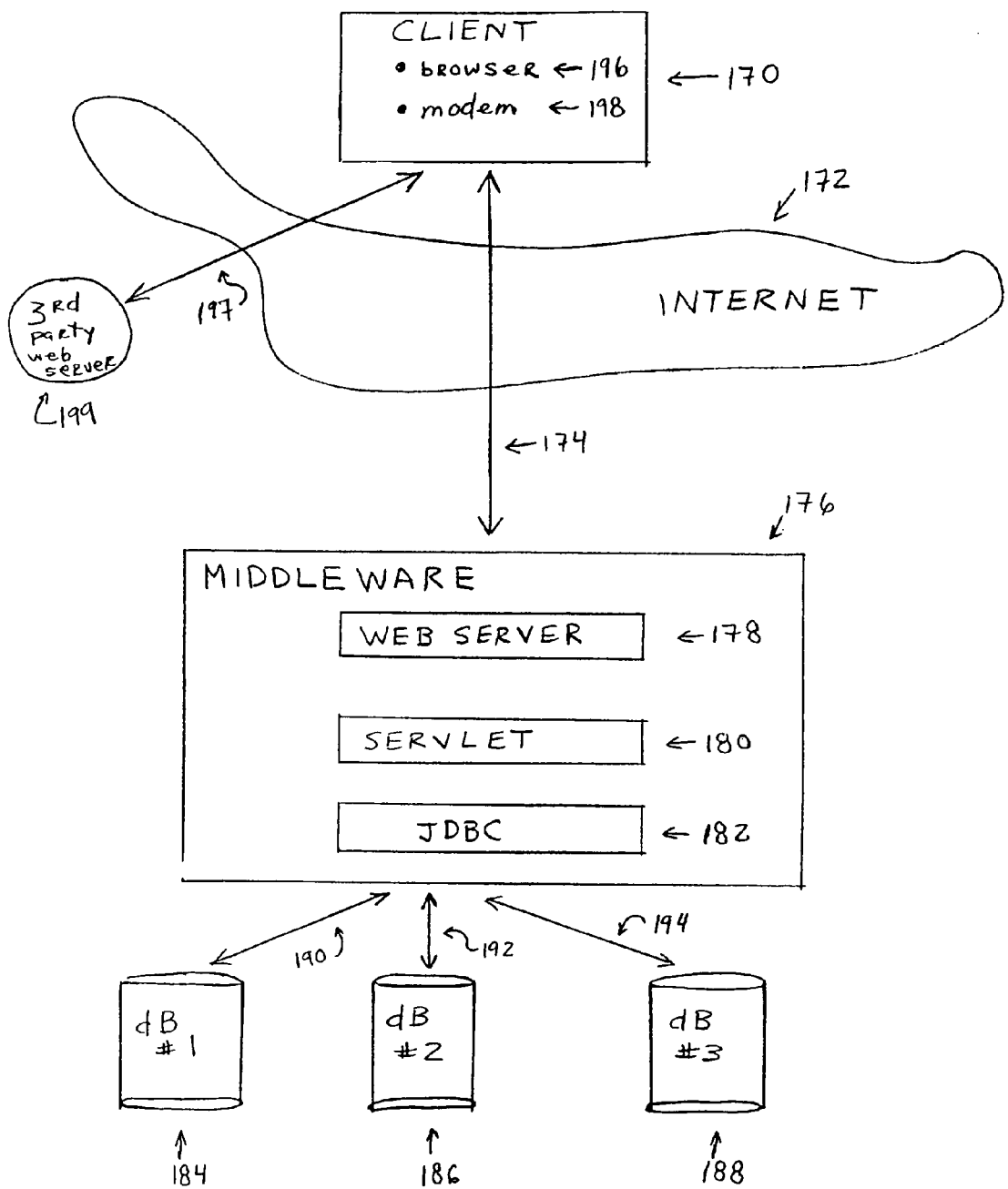
FIG. 4 illustrates an implementation of the client-server model whereby a client is linked to databases through the internet and middleware.

The local client computer can be a computer system with a graphical user interface, such as the exemplary computer system illustrated in FIG. 1. Resident applets can be saved on the mass storage device 406 and moved to the main memory 402 during execution. The search engine's graphical user interface of the present invention can be displayed on the CRT 410 and controlled by use of the computer mouse 405 and the keyboard 404.

The present invention is well designed for use by the general population. First, the invention is designed for use with a standard internet browser. Proprietary software does not have to be installed by the searcher. Second, use of the applet permits the local client to generate many of the internet browser screen refreshes. Thus, unlike a typical session with an internet browser, the searcher need not wait for a new screen to be requested and received over a communication line each time a button on the screen is pressed. Unhindered by communication delays, the searcher has the ability to manipulate the Boolean graphics and the search cells in real time. Local screen refreshes also make the use of user-friendly graphics feasible, such that novice searchers are able to draft and execute well-structured Boolean queries.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A method for providing a graphical user interface in a computing system for building Boolean queries and viewing search results, comprising:
    defining a window including a workspace, a toolbar, and a folder tree hierarchy;
    providing two or more search folders located within the folder tree hierarchy, each search folder capable of being moved within the folder tree hierarchy and configured for displaying a search by type icon, a text field, and a hit count; and
    providing one or more combination folders, each combination folder capable of being moved within the folder tree hierarchy and having a combine icon,
    wherein the toolbar is further defined to include a search by group, a combine group, and an actions group:
        a) the search by group being further defined to have a category button, a keyword button, and a date button, wherein:
            i) when the category button is selected, one search folder is generated with a category icon as the search by icon;
            ii) when the keyword button is selected, one search folder is generated with a keyword icon as the search by icon; and
            iii) when the date button is selected, one search folder is generated with a date icon as the search by icon;
        b) the combine group being further defined to have a logical AND button, a logical OR button and a logical MINUS button, wherein:
            i) when the logical AND button is selected, one combination folder is generated with a logical AND icon as the combine icon;
            ii) when the logical OR button is selected, one combination folder is generated with a logical OR icon as the combine icon; and
            iii) when the logical MINUS button is selected, one combination folder is generated with a logical MINUS icon as the combine icon; and
        c) the actions group being further defined to have a remove button, a results button, an expand/collapse button and a quit button, wherein:
            i) when the remove button is selected, selected combination folders and selected search folders are removed from the workspace;
            ii) when the results button is selected, a query defined by each selected combination folder is executed and a results tab is generated;
            iii) when the expand/collapse button is selected, the selected combination cell is alternately collapsed into itself and expanded to show search cells within the selected combination cell; and
            iv) when the quit button is selected, the window is closed.

2. The method for providing a graphical user interface for building Boolean queries and viewing search results as in claim 1, wherein when the results button is selected, the search results are displayed within the workspace.

3. The method for providing a graphical user interface for building Boolean queries and viewing search results as in claim 2, wherein the workspace is defined to include a title, a media type, and a location for each displayed search result.

4. The method for providing a graphical user interface for building Boolean queries and viewing search results as in claim 3, wherein the location is a URL address.

5. The method for providing a graphical user interface for building Boolean queries and viewing search results as in claim 1, wherein the window is defined to include a menu bar.

6. The method for providing a graphical user interface for building Boolean queries and viewing search results as in claim 5, wherein the menu bar is defined to include a session menu, a collection menu, a query menu, a select menu, and a help menu, wherein:
    a) the session menu is defined to include a new session option, an open session option, a save session option, a close session option, and an exit option;
    b) the collection menu is defined to include a new collection option, an open collection option, a merge collection option, a save option, and a close collection option;
    c) the query menu is defined to include a search by category option, a search by keyword option, a search by numeric and date option, a combine by logical AND option, a combine by logical OR option, a combine by logical MINUS option and an execute search option;
d) the select menu is defined to include a select all option, an unselect all option, and a selection option; and
e) the help menu is defined to include an index option and an about option.

7. A computer-readable storage medium having computer-executable instructions for performing the steps recited in claim 1.

* * * * *